Nov. 19, 1929.  J. E. BOND  1,736,426
PUMP BEARING
Filed Oct. 16, 1926

Inventor:
Joseph E. Bond,
By Chas P Murray
atty.

Patented Nov. 19, 1929

1,736,426

UNITED STATES PATENT OFFICE

JOSEPH E. BOND, OF APPLETON, WISCONSIN, ASSIGNOR TO HAYTON PUMP & BLOWER CO., OF APPLETON, WISCONSIN, A CORPORATION OF WISCONSIN

PUMP BEARING

Application filed October 16, 1926. Serial No. 141,975.

My invention relates to centrifugal pumps and particularly to an impeller bearing adapted for use in connection therewith.

One of the more important difficulties in the handling of liquids containing grit is that of maintaining pumps and pump bearings. Centrifugal pumps are best adapted for the handling of such liquids, but the excessive wear at the impeller bearing results in numerous and expensive delays for repacking or replacement of parts.

An object of my invention is to provide a bearing element for the impeller of a centrifugal pump, the bearing being completely isolated from the liquid that is handled by the pump. The result is secured by providing a relatively long, cylindrical sleeve, axially arranged relative to the impeller and fixed thereto, and suitable antifriction bearing elements mounted within the sleeve and cooperating with a hollow stub shaft maintained in fixed relation within the sleeve. A stuffing box of common form prevents the escape of liquid around the periphery of the sleeve, but no liquid can gain entrance into the bearing. By this means, the pump is adapted to handle liquids containing sand or other fine particles of abrasive material without interruption on account of bearing trouble.

Figure 1:
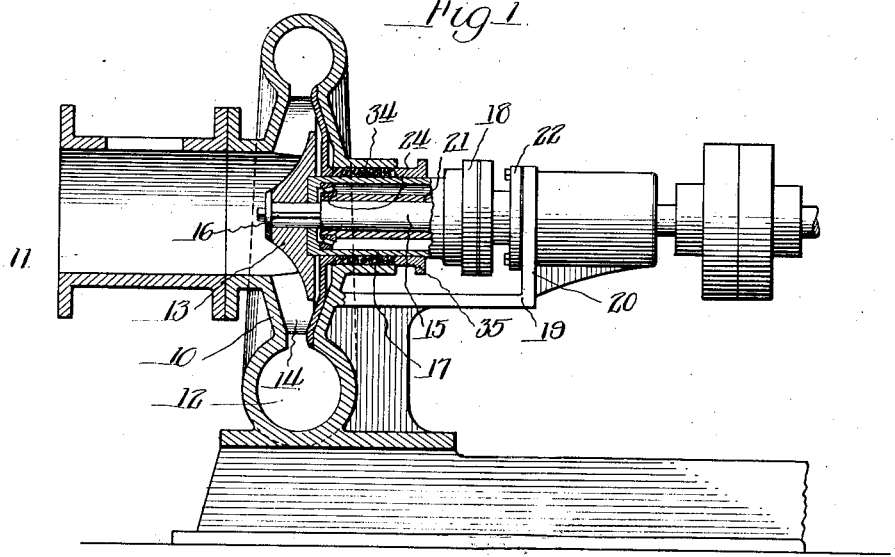
Figure 2:
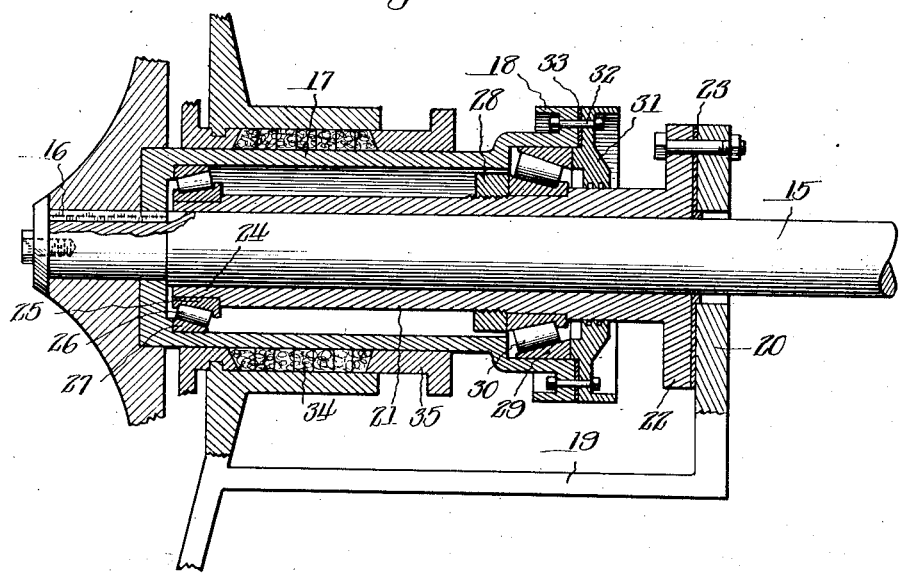

The invention will be more readily understood by reference to the accompanying drawing, in which;

Fig. 1 is a sectional elevation of a centrifugal pump to which my improvement has been applied; and Fig. 2 is an enlarged sectional view showing the parts in detail.

In the drawings, I have shown a centrifugal pump having a casing, 10, an inlet, 11, and an outlet, 12. The impeller, 13, has the usual vanes, 14 and is rigidly mounted on a shaft, 15 by means of the key, 16. Also fixed to the impeller, 13, is a sleeve, 17, having marginal flanges, 18.

Fixed to the base or frame of the pump is a bracket, 19, having a vertical extension, 20, through which the shaft, 15 extends. A cylindrical, hollow, stub shaft or bearing support, 21, is provided with a flange, 22, bolted to the vertical plate or extension, 20, liners, 23, being interposed between the adjacent surfaces of the parts, 20, 22, for a purpose to be hereafter described.

On the reduced inner end, 24 of the cylindrical member 21 is mounted a roller bearing ring, 25, constituting a part of the roller bearing assembly. The rollers are indicated at 26, and the outer bearing ring at 27, the latter being held in the sleeve, 17. Adjustment of these roller bearings is effected by means of the liners, 23, the addition of a liner strip serving to extend the cylindrical member 21 and to take up possible wear in the bearing.

It is possible and practical to mount the impeller on a single roller or ball bearing, but I prefer, as illustrated, to utilize two of such bearings. The second bearing assembly comprises an inner bearing ring, 28, secured by threads to the cylindrical member, 21, the rollers 30 and an outer bearing ring, 29, firmly fixed in an enlargement of the axial opening in the sleeve, 17. The otherwise open end of the sleeve is closed by means of a circular flanged element, 31, held against the flange 18 of the sleeve by means of the bolts 32 and bearing against the outer bearing ring, 29. Adjustment of the tapered roller bearings is effected by means of liner strips 33 between the faces of the flanges.

Packing, 34, is interposed between the pump housing and the rotating sleeve, the packing being held by split gland members, 35 of common form.

Thus I have provided a bearing construction of ideal form and have completely isolated the bearing elements from possible contact with abrasive particles carried by the liquid being handled.

I claim:

1. In a pump, a housing, an impeller and an impeller shaft, a sleeve surrounding the shaft and rigid with respect to the housing, a second sleeve rigid with the impeller and telescoped over said first mentioned sleeve, an anti-friction bearing interposed between the two sleeves, and packing interposed between the outer sleeve and housing.

2. In a centrifugal pump, the combination with a housing, of an impeller, a driving shaft, a bracket rigid with the housing, a sleeve surrounding the shaft and non-rotatably held relative thereto by said bracket, a second sleeve fixed to and rotatable with the impeller and telescoped over the first sleeve, an anti-friction bearing interposed between said sleeves, and packing interposed between the outer sleeve and housing.

3. The combination with a pump casing and impeller, of a drive shaft, a bracket rigid with the casing, a cylindrical member surrounding the shaft and fixed to the bracket, a hollow cylinder axially located and fixed to the impeller and projecting rearwardly therefrom in telescoped relation to said cylindrical member, and bearing members mounted in said hollow cylinder and supported on said cylindrical member.

4. In combination, a pump casing, an impeller, an impeller shaft, a bracket rigid with the casing, a hollow stub shaft fixed to the bracket and through which said impeller shaft is extended, a sleeve secured to and projecting axially from the rear side of said impeller and mounted over said stub shaft, bearing members interposed between said sleeve and said stub shaft, and means carried by the sleeve for effecting adjustment of the bearing members.

In testimony whereof I have affixed my signature.

JOSEPH E. BOND.